(12) United States Patent
Babel et al.

(10) Patent No.: US 10,053,346 B2
(45) Date of Patent: Aug. 21, 2018

(54) CONTROL MODULE AND PALM REST FOR A MATERIALS HANDLING VEHICLE

(71) Applicant: Crown Equipment Corporation, New Bremen, OH (US)

(72) Inventors: Christoph Babel, Tuerkenfeld (DE); James V. Kraimer, Haimhausen (DE)

(73) Assignee: Crown Equipment Corporation, New Bremen, OH (US)

( * ) Notice: Subject to any disclaimer, the term of this patent is extended or adjusted under 35 U.S.C. 154(b) by 248 days.

(21) Appl. No.: 15/007,590

(22) Filed: Jan. 27, 2016

(65) Prior Publication Data

US 2016/0221808 A1 Aug. 4, 2016

Related U.S. Application Data

(60) Provisional application No. 62/109,105, filed on Jan. 29, 2015.

(51) Int. Cl.
*B66F 9/075* (2006.01)
*B66F 9/20* (2006.01)
(Continued)

(52) U.S. Cl.
CPC ............ *B66F 9/0759* (2013.01); *B62D 33/06* (2013.01); *B66F 9/06* (2013.01); *B66F 9/20* (2013.01)

(58) Field of Classification Search
CPC . B66F 9/0759; B66F 9/06; B66F 9/20; B62D 33/06
See application file for complete search history.

(56) References Cited

U.S. PATENT DOCUMENTS 4,738,417 A 4/1988 Wenger
4,862,165 A 8/1989 Gart
(Continued)

FOREIGN PATENT DOCUMENTS

DE 19951379 A1 5/2001
DE 102004052757 A1 5/2006
(Continued)

OTHER PUBLICATIONS

Baharlou, Simin: International Preliminary Report On Patentability; International Application No. PCT/US2016/015069 dated Aug. 1, 2017; International Bureau of WIPO; Geneva, Switzerland.
(Continued)

*Primary Examiner* — Faye M Fleming
(74) *Attorney, Agent, or Firm* — Stevens & Showalter, LLP

(57) ABSTRACT

A materials handling vehicle includes a frame defining a main structural component of the vehicle, a load handling assembly, and an operator's compartment provided within the frame. The operator's compartment includes a control module including structure for controlling at least one vehicle function. The control module may include a fin-shaped handhold element extending generally vertically upward from an upper surface defined by the upper surface. The fin-shaped handhold element may include structure for controlling at least one vehicle function. Further, a moveable palm rest may be provided to allow an operator to position their hand at a desired position relative to the control module.

34 Claims, 6 Drawing Sheets

(51) Int. Cl.
 *B62D 33/06* (2006.01)
 *B66F 9/06* (2006.01)

(56) References Cited

U.S. PATENT DOCUMENTS

| | | | |
|---|---|---|---|
| 4,895,040 A * | 1/1990 | Soederberg | B66F 9/20 |
| | | | 180/315 |
| D309,051 S | 7/1990 | Laatsch | |
| 4,997,054 A | 3/1991 | Denny et al. | |
| D336,713 S | 6/1993 | Avitan et al. | |
| D405,581 S | 2/1999 | Henshaw et al. | |
| 5,890,562 A | 4/1999 | Bartels et al. | |
| 5,938,282 A | 8/1999 | Epple | |
| 6,025,831 A | 2/2000 | Gardiner | |
| 6,112,612 A | 9/2000 | Seksaria et al. | |
| 6,152,676 A | 11/2000 | Evert et al. | |
| 6,564,896 B1 | 5/2003 | Proksch et al. | |
| 6,755,275 B2 | 6/2004 | Okanda | |
| 6,971,194 B2 | 12/2005 | McClelland et al. | |
| D515,770 S | 2/2006 | Ryan et al. | |
| 7,010,404 B2 | 3/2006 | Ichijo et al. | |
| D526,109 S | 8/2006 | Bergman et al. | |
| D526,757 S | 8/2006 | Bergman et al. | |
| D536,153 S | 1/2007 | Niebuhr et al. | |
| 7,204,338 B2 | 4/2007 | Katae et al. | |
| 7,347,299 B2 | 3/2008 | Billger et al. | |
| 7,350,866 B2 | 4/2008 | Billger et al. | |
| D575,924 S | 8/2008 | Niebuhr | |
| 7,497,298 B2 | 3/2009 | Shearer et al. | |
| 7,520,567 B2 | 4/2009 | Billger et al. | |
| D598,023 S | 8/2009 | Miller et al. | |
| 7,635,045 B2 | 12/2009 | Shearer et al. | |
| 7,641,021 B2 | 1/2010 | Behncke et al. | |
| 7,654,359 B2 | 2/2010 | Ott et al. | |
| 7,712,571 B2 | 5/2010 | Proud et al. | |
| 7,775,317 B1 | 8/2010 | Goodwin et al. | |
| 8,212,770 B2 | 7/2012 | Obourn et al. | |
| 8,282,051 B2 | 10/2012 | Nutaro et al. | |
| 8,434,562 B2 | 5/2013 | Miyasaka et al. | |
| D695,792 S | 12/2013 | Jensen | |
| 8,960,361 B2 | 2/2015 | Helot et al. | |
| D767,457 S * | 9/2016 | Babel | D12/195 |
| D775,449 S * | 12/2016 | Babel | D12/177 |
| 2005/0034549 A1 | 2/2005 | Braud | |
| 2007/0018493 A1 | 1/2007 | Kawachi et al. | |
| 2007/0273207 A1 | 11/2007 | Dorn et al. | |
| 2007/0295551 A1 | 12/2007 | Proud et al. | |
| 2008/0232891 A1 | 9/2008 | Macklin et al. | |
| 2014/0062884 A1 | 3/2014 | Davies et al. | |
| 2017/0225930 A1* | 8/2017 | Rekow | B66F 9/0759 |

FOREIGN PATENT DOCUMENTS

| | | |
|---|---|---|
| DE | 102009052241 A1 | 5/2011 |
| EP | 0305650 A1 | 3/1989 |
| EP | 0558884 A1 | 9/1993 |
| EP | 0712062 A2 | 5/1996 |
| EP | 0943976 A2 | 9/1999 |
| EP | 0947906 A2 | 10/1999 |
| EP | 1188600 A2 | 3/2002 |
| EP | 1205426 A1 | 5/2002 |
| EP | 1238940 A2 | 9/2002 |
| EP | 1627848 A2 | 2/2006 |
| EP | 1747964 A2 | 1/2007 |
| EP | 1748026 A1 | 1/2007 |
| EP | 1775254 A2 | 4/2007 |
| EP | 1959329 A1 | 8/2008 |
| EP | 2277369 A1 | 1/2011 |
| EP | 2308752 A1 | 4/2011 |
| EP | 2511224 B1 | 1/2014 |
| GB | 2344410 A | 6/2000 |
| JP | H08081197 A | 3/1996 |
| JP | H11199192 A | 7/1999 |
| WO | 2009012856 A1 | 1/2009 |
| WO | 2015019943 A1 | 2/2015 |

OTHER PUBLICATIONS

Serodio, Renato; International Search Report and Written Opinion of the International Search Authority; International Application No. PCT/US2016/015069; dated Oct. 26, 2016; European Patent Office; Rijswijk, Netherlands.

* cited by examiner

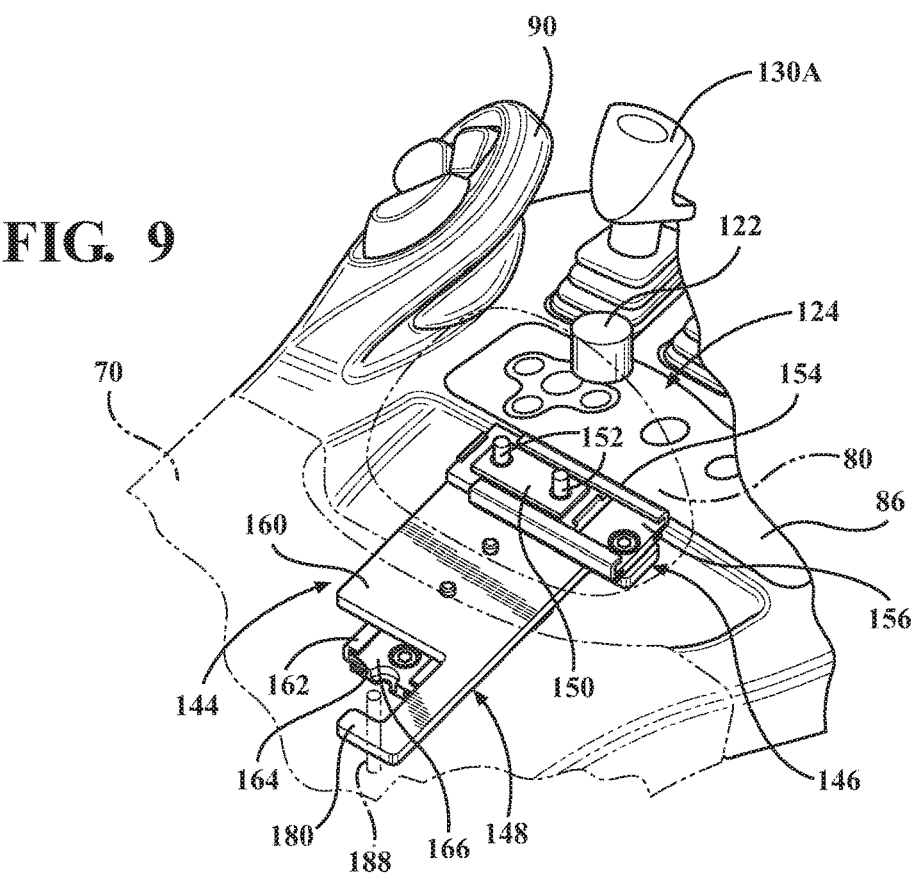
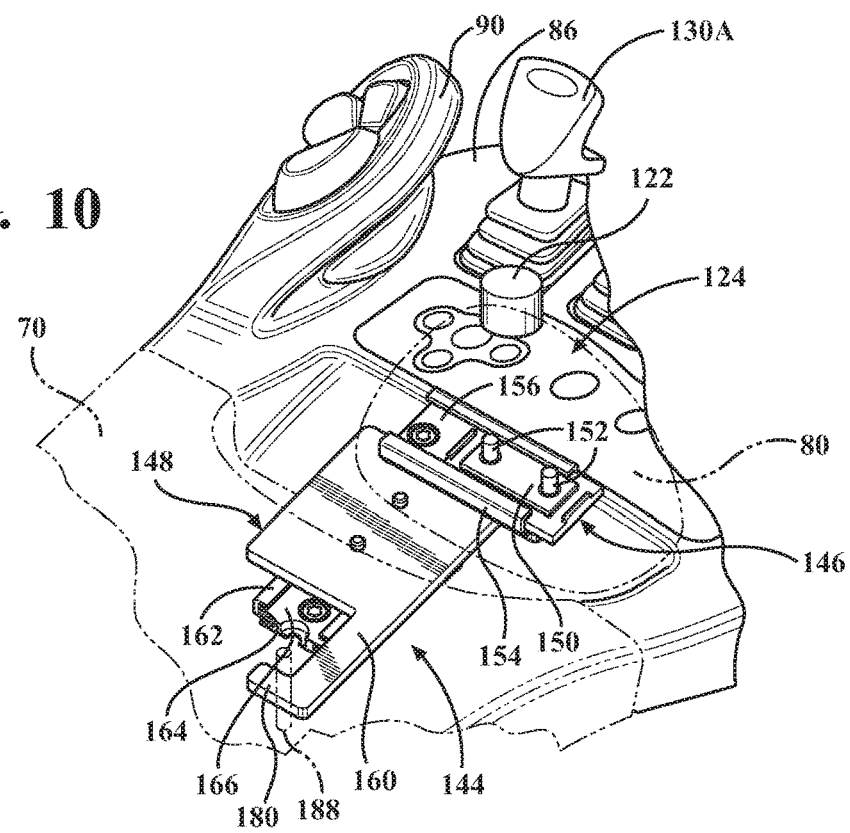

CONTROL MODULE AND PALM REST FOR A MATERIALS HANDLING VEHICLE

CROSS REFERENCE TO RELATED APPLICATION

This application claims the benefit of U.S. Provisional Patent Application Ser. No. 62/109,105, filed Jan. 29, 2015, and entitled "CONTROL MODULE AND PALM REST FOR A MATERIALS HANDLING VEHICLE" the entire disclosure of which is hereby incorporated by reference herein.

FIELD OF THE INVENTION

The present invention relates generally to a materials handling vehicle including an adjustable palm rest and a control module comprising a fin-shaped handhold element including structure for controlling at least one vehicle function.

BACKGROUND OF THE INVENTION

Certain types of materials handling vehicles, such as counterbalance forklift trucks, reach trucks, turret trucks, etc., typically include armrests for receiving the arm of an operator driving the vehicle. Such armrests may be used by an operator when using structure (handles, buttons, levers, etc.) for controlling various vehicle functions, such as travel functions and/or load handling functions, e.g., fork raise/lower, tilt, sideshift, etc. An example of one such armrest is disclosed in U.S. Pat. No. 7,726,745, the entire disclosure of which is hereby incorporated by reference herein.

BRIEF SUMMARY OF THE INVENTION

The present invention relates to materials handling vehicles that include an armrest for receiving the arm of an operator driving the vehicle, and a control module adjacent the armrest. The control module includes structure for controlling various vehicle functions, including travel functions and load handling assembly functions. The vehicle also includes a palm rest that is moveable in lateral and/or longitudinal directions so that the operator can position their hand in a desired location relative to the control module and the structure provided on the control module for controlling the vehicle functions.

In accordance with a first aspect of the present invention, a materials handling vehicle is provided comprising: a frame defining a main structural component of the vehicle; a load handling assembly; and an operator's compartment provided within the frame. The operator's compartment comprises a control module including structure for controlling at least one vehicle function and a fin-shaped handhold element extending generally vertically upward from an upper surface defined by the upper surface. The fin-shaped handhold element includes an upper portion distal from the upper surface of the control module, which upper portion is oriented at an angle of about 45°-75° relative to the upper surface so as to form an undercut area between the upper surface and the upper portion of the fin-shaped handhold element.

The fin-shaped handhold element may be oriented at the angle of about 45°-75° relative to the upper surface in a lateral direction defined between a first side of the control module located proximate to an operator working position within the operator's compartment and a second side of the control module located distal from the operator working position. The fin-shaped handhold element may be sized and shaped to be received by the joint between an operator's thumb and index finger, and may be no more than about 2.5 inches wide as measured in the lateral direction at a junction of the fin-shaped handhold element that receives the joint between the operator's thumb and index finger. The width of the fin-shaped handhold element may taper in the lateral direction from the base to the upper portion, and the fin-shaped handhold element may comprise a continuously curved member from the base to the outer portion.

The fin-shaped handhold element may include structure for controlling at least one vehicle function via the thumb of an operator using the control module. Said structure on the fin-shaped handhold element may be provided for controlling at least one of: a travel direction of the vehicle; at least one load handling assembly function; and a vehicle horn. As one example, said structure may include a horn structure for sounding a vehicle horn and at least one additional structure for controlling at least one other vehicle function, wherein the horn structure may be located forward from the additional structure toward a front portion of the operator's compartment. The control module may include at least one additional structure extending upwardly from the upper surface of the control module for controlling at least one vehicle function via at least one of the operator's fingers. As one example, the control module may include a plurality of additional structures extending upwardly from the upper surface of the control module for controlling a plurality of load handling assembly functions via the operator's fingers.

The vehicle may further comprise an armrest in the operator's compartment proximate to the control module, the armrest for receiving the arm of an operator using the control module. The vehicle may yet further include a palm rest in the operator's compartment proximate to the armrest, the palm rest for receiving the palm of the operator. The palm rest may be adjustable such that the operator can position their hand at a desired location with respect to the structure for controlling the at least one vehicle function. Still further, the palm rest may be adjustable in both a lateral direction and a longitudinal direction, the lateral direction defined between a first side of the control module located proximate to an operator working position in the operator's compartment and a second side of the control module located distal from the operator working position, and the longitudinal direction defined between a first end of the control module located proximate to the armrest and a second end of the control module located distal from the armrest.

In accordance with a second aspect of the present invention, a materials handling vehicle is provided comprising: a frame defining a main structural component of the vehicle; a load handling assembly; and an operator's compartment provided within the frame. The operator's compartment comprises a control module including structure for controlling at least one vehicle function, an armrest proximate to the control module, the armrest for receiving the arm of an operator using the control module, and a palm rest proximate to the armrest. The palm rest is provided for receiving the palm of the operator and is adjustable in both a lateral direction and a longitudinal direction such that the operator can position their hand at a desired location with respect to the structure for controlling the at least one vehicle function. The lateral direction is defined between a first side of the control module located proximate to an operator working position within the operator's compartment and a second side of the control module located distal from the operator working position, and the longitudinal direction is defined between a first end of the control module located proximate to the armrest and a second end of the control module located distal from the armrest.

The structure of the control module for controlling the at least one vehicle function may comprise structure extending upwardly from an upper surface of the control module for being implemented via at least one of the operator's fingers. Said structure may include a plurality of structures extending upwardly from the upper surface of the control module for controlling a plurality of load handling assembly functions via the operator's fingers.

The control module may define an upper surface and may include a fin-shaped handhold element extending generally vertically upward from the upper surface, the fin-shaped handhold element including an upper portion distal from the upper surface of the control module that is oriented at an angle of about 45°-75° relative to the upper surface so as to form an undercut area between the upper surface of the control module and the upper portion of the fin-shaped handhold element. The fin-shaped handhold element may be oriented at the angle of about 45°-75° relative to the upper surface in the lateral direction toward the second side of the control module. Further, the fin-shaped handhold element may be sized and shaped to be received by the joint between the operator's thumb and index finger, and the fin-shaped handhold element may include the structure for controlling the at least one vehicle function via the thumb of the operator. Said structure may control at least one of: a travel direction of the vehicle; at least one load handling assembly function; and a vehicle horn. As one example, said structure may comprise a horn structure for sounding a vehicle horn and at least one additional structure for controlling at least one other vehicle function, wherein the horn structure may be located forward from the additional structure toward second end of the control module.

The vehicle may further comprise attachment structure that allows movement of the palm rest in both the lateral direction and the longitudinal direction, which attachment structure may include a lateral attachment assembly comprising a first part that is secured to the palm rest and does not move relative to the palm rest and a second part that the palm rest is movable laterally relative to via sliding movement between the first part of the lateral attachment assembly and the second part. The second part of the lateral attachment assembly may define a channel which the first part slides within to effect lateral movement of the palm rest. The attachment structure may further include a longitudinal attachment assembly comprising a first piece that does not move longitudinally relative to the palm rest and a second piece that the palm rest is movable longitudinally relative to via sliding movement between the first piece of the longitudinal attachment assembly and the second piece. The first piece of the longitudinal attachment assembly my include at least one series of notches that are capable of receiving at least one protuberance associated with a securing structure to secure the first piece and the palm rest in a chosen position until further movement of the palm rest in the longitudinal direction is desired, in which case the palm rest can be manipulated by the operator to remove the at least one protuberance from the corresponding notch, thereby again allowing longitudinal movement of the palm rest relative to the securing structure.

The palm rest may include an undercut portion in an end of the palm rest located toward the second end of the control module, the undercut portion for receiving the fingertips of the operator when the operator's hand is in a horizontal gripping position.

In accordance with a third aspect of the present invention, a materials handling vehicle is provided comprising: a frame defining a main structural component of the vehicle; a load handling assembly; and an operator's compartment provided within the frame. The operator's compartment comprises a control module including structure for controlling at least one vehicle function, an armrest proximate to the control module, the armrest for receiving the arm of an operator using the control module, and a palm rest proximate to the armrest. The palm rest is provided for receiving the palm of the operator and is adjustable in a lateral direction such that the operator can position their hand at a desired location with respect to the structure for controlling the at least one vehicle function. The lateral direction is defined between a first side of the control module located proximate to an operator working position within the operator's compartment and a second side of the control module located distal from the operator working position.

In accordance with a fourth aspect of the present invention, a materials handling vehicle is provided comprising: a frame defining a main structural component of the vehicle; a load handling assembly; and an operator's compartment provided within the frame. The operator's compartment comprises a control module including structure for controlling at least one vehicle function, an armrest proximate to the control module, the armrest for receiving the arm of an operator using the control module, and a palm rest proximate to the armrest. The palm rest is provided for receiving the palm of the operator and is adjustable in a longitudinal direction such that the operator can position their hand at a desired location with respect to the structure for controlling the at least one vehicle function. The longitudinal direction is defined between a first end of the control module located proximate to the armrest and a second end of the control module located distal from the armrest.

BRIEF DESCRIPTION OF THE SEVERAL VIEWS OF THE DRAWINGS

FIGS. 7-10 are views illustrating an attachment assembly used to secure a movable palm rest within an operator's compartment of the vehicle of FIG. 1.

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
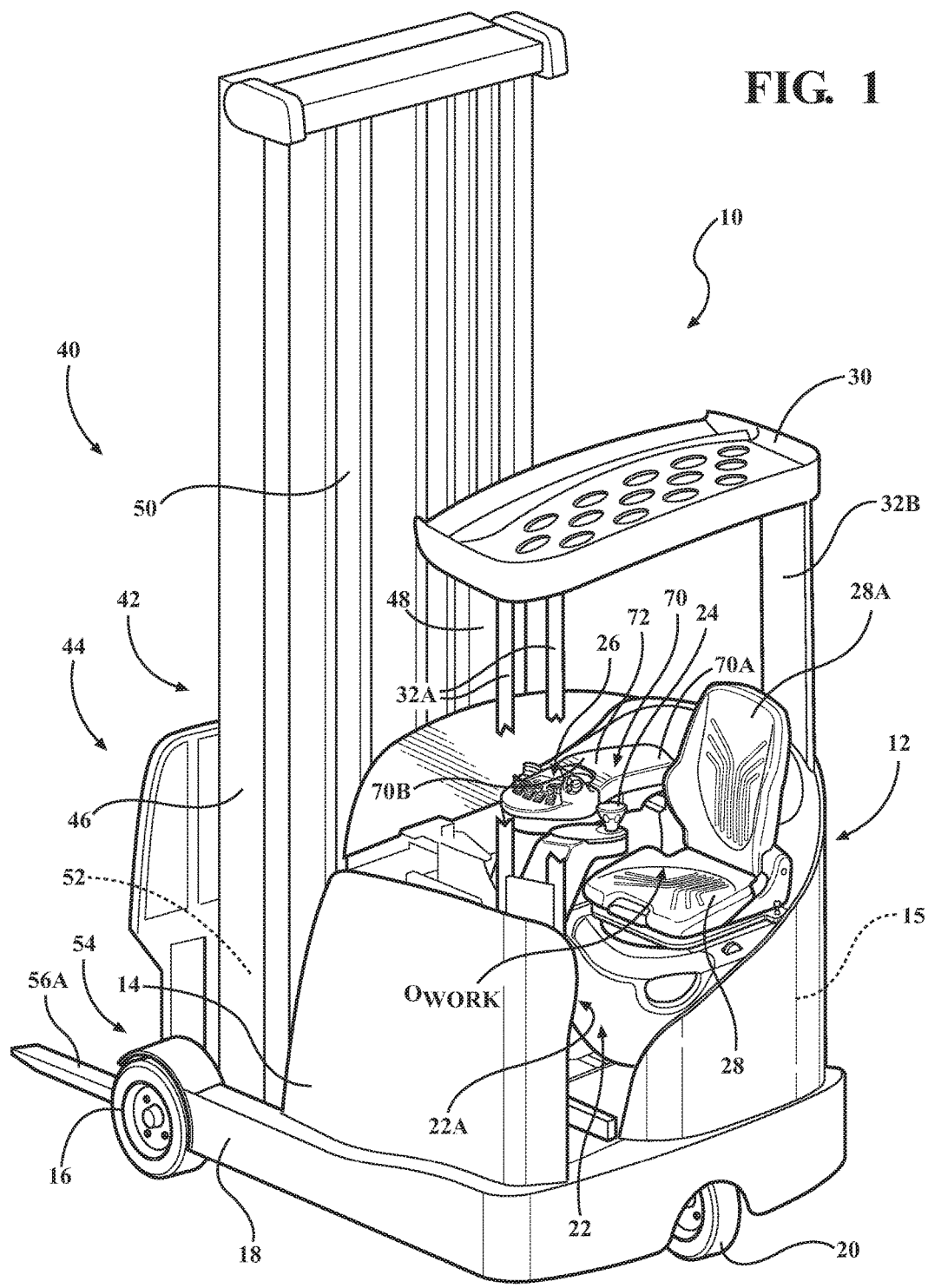
FIG. 1 is a perspective view of a materials handling vehicle according to an aspect of the present invention.

Referring now to FIG. 1, a materials handling vehicle 10 (hereinafter "vehicle") is shown. While the present invention is described herein with reference to the illustrated vehicle 10, which comprises a forklift truck, it will be apparent to those skilled in the art that the present invention may be used in a variety of other types of materials handling vehicles.

The vehicle 10 includes a main body or power unit 12, which includes a frame 14 defining a main structural component of the vehicle 10 and which houses a battery 15. The vehicle 10 further comprises a pair of fork-side first wheels 16 (only one first wheel is shown in FIG. 1) coupled to first and second outriggers 18 (only one outrigger is shown in FIG. 1), and a powered and steered second wheel 20 located underneath the frame 14. The wheels 16, 20 allow the vehicle 10 to move across a floor surface.

An operator's compartment 22 is located within the main body 12 for receiving an operator driving the vehicle 10. A tiller knob 24 is provided within the operator's compartment for controlling steering of the vehicle 10. The speed and direction of movement (forward or reverse) of the vehicle 10 are controlled by the operator via a control module 26 provided adjacent to an operator seat 28, which control module 26 controls one or more other vehicle functions and will be discussed in greater detail below. The vehicle 10 further includes an overhead guard 30 including first and second horizontal support structures 32A, 32B affixed to the vehicle frame 14.

A load handling assembly 40 of the vehicle 10 includes, generally, a mast assembly 42 and a carriage assembly 44, which is movable vertically along the mast assembly 42. The mast assembly 42 is positioned between the outriggers 18 and includes a fixed mast member 46 affixed to the frame 14, and nested lower and upper movable mast members 48, 50. It is noted that the vehicle 10 may include additional or fewer movable mast members than the two shown in FIG. 1, i.e., the lower and upper movable mast members 48, 50. The carriage assembly 44 includes conventional structure including a reach assembly 52, a fork carriage 54, and fork structure comprising a pair of forks 56A, 56B.

The battery 15 supplies power to a traction motor (not shown) connected to the second wheel 20 and to one or more hydraulic motors (not shown), which supply power to several different systems, such as hydraulic cylinders for effecting generally vertical movement of the movable mast members 48, 50, generally vertical movement of the carriage assembly 44 relative to the mast assembly 42, generally longitudinal movement of the reach assembly 52, commonly referred to as reach, and generally transverse or lateral movement of the fork carriage 54, commonly referred to as sideshifting. The traction motor and the second wheel 20 define a drive mechanism for effecting movement of the vehicle 10 across the floor surface.

An armrest 70 is provided in the operator's compartment 22 proximate to the control module 26, see FIGS. 1-6. The armrest 70 includes a pad 72 for receiving the arm of an operator using the control module 26. A first end 70A of the armrest 70 (see FIG. 1) is located adjacent to a seatback cushion 28A of the operator seat 28 and may receive the operator's elbow, and a second end 70B of the armrest 70, which is spaced longitudinally from the first end 70A, is located adjacent to the control module 26 and may receive the operator's wrist or forearm.

Referring now to FIGS. 2-6, a palm rest 80 is provided in the operator's compartment 22 proximate to the second end 70B of the armrest 70 and the control module 26, i.e., between the second end 70B of the armrest 70 and the control module 26, for receiving the operator's palm. As will be discussed herein with reference to FIGS. 7-9, the palm rest 80 is moveable/adjustable in both a lateral direction $D_{LAT}$ and a longitudinal direction $D_{LONG}$ such that the operator can position their hand at a desired location with respect to control module 26. As used herein and with reference to FIG. 2, the lateral direction $D_{LAT}$ is defined between a first side 26A of the control module 26 located proximate to an operator working position $O_{WORK}$ within the operator's compartment 22, e.g., the position of the operator while sitting on the operator seat 28 in the vehicle 10 illustrated in FIG. 1, and a second side 26B of the control module 26 located distal from the operator working position $O_{WORK}$, and the longitudinal direction $D_{LONG}$ is defined between a first end 26C of the control module 26 located proximate to the armrest 70 and a second end 26D of the control module 26 located distal from the armrest 70.

The control module 26 illustrated in FIGS. 2-6 will now be described. The control module 26 includes an upper surface 86 spanning laterally between the first and second sides 26A, 26B and spanning longitudinally between the first and second ends 26C, 26D. The upper surface 86 may define a generally planar surface, i.e., a flat surface, or the upper surface 86 may comprise a non-planar surface having one or more curves or non-flat portions.

According to an aspect of the invention, the control module 26 includes a fin-shaped handhold element 90 (hereinafter "element 90") extending generally vertically upward from the upper surface 86. The element 90 in the embodiment shown comprises a continuously curved member from a base portion 92 of the element 90 located at a junction with the upper surface 86 to an upper portion 94 distal from the upper surface 86. The curvature of the element 90 results in the upper portion 94 being oriented at an angle α of about 45°-75° relative to the upper surface 86 of the control module 26, as measured at the base portion 92 of the element 90. The angle α is preferably about 50-60° relative to the upper surface 86 in the lateral direction $D_{LAT}$, so as to form an undercut area 96 between the upper surface 86 and the upper portion 94 of the element 90, see FIGS. 3 and 5.

Figure 2:
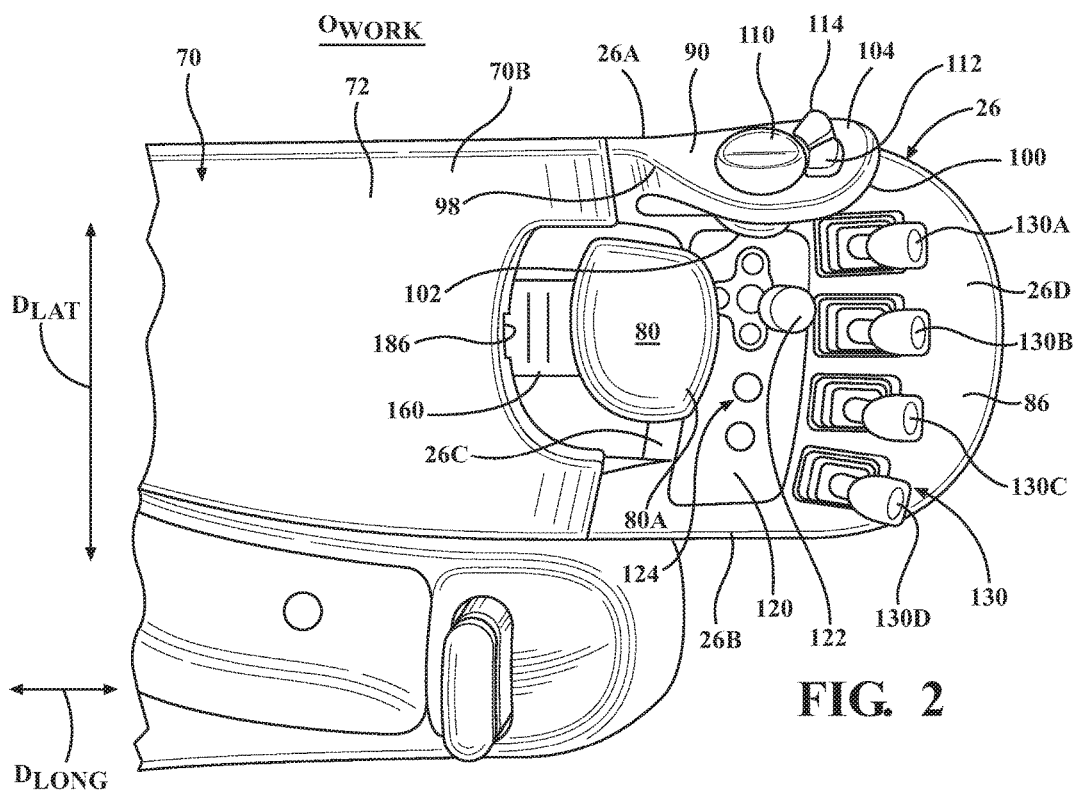
FIG. 2 is a top view of a control module of the materials handling vehicle of FIG. 1.
Figure 3:
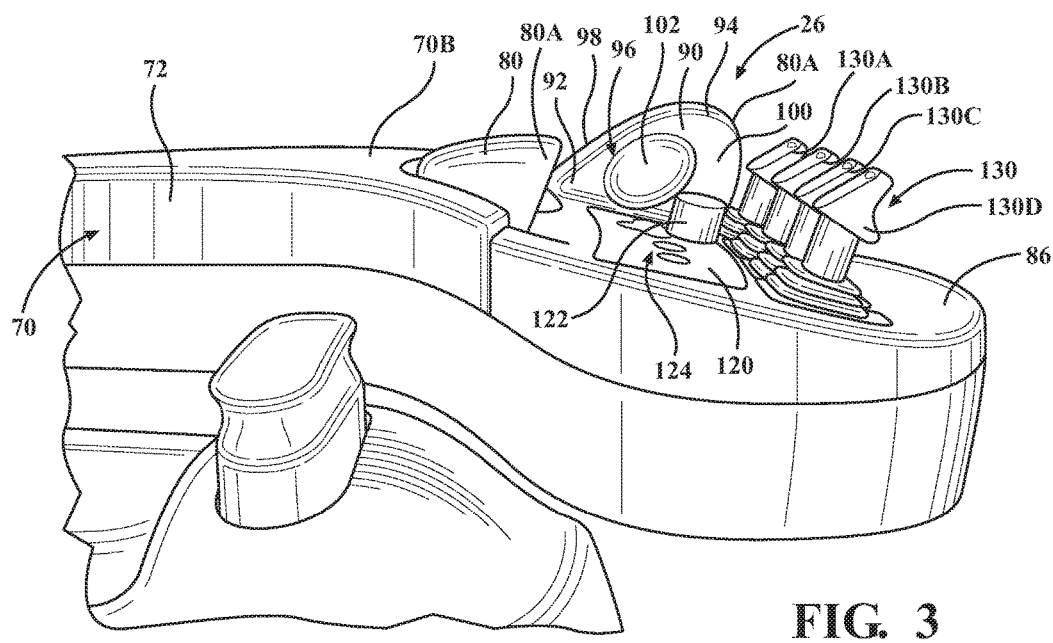
FIG. 3 is an outer side view of the control module of the materials handling vehicle of FIG. 1.
Figure 4:
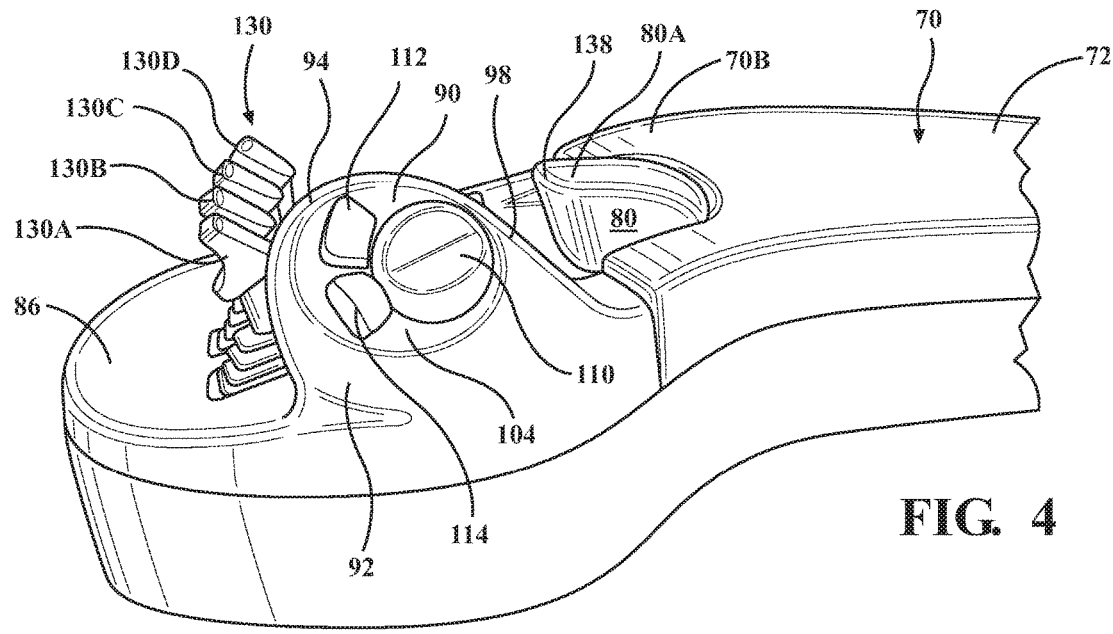
FIG. 4 is an inner side view of the control module of the materials handling vehicle of FIG. 1.
Figure 5:
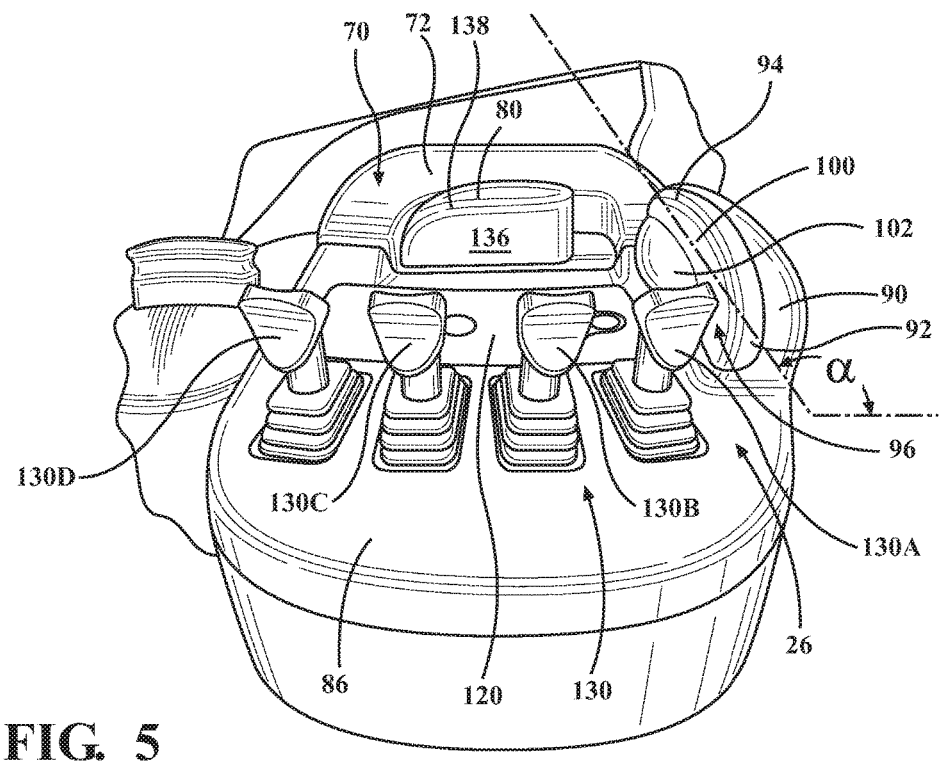
FIG. 5 is an end view of the control module of the materials handling vehicle of FIG. 1.
Figure 6:
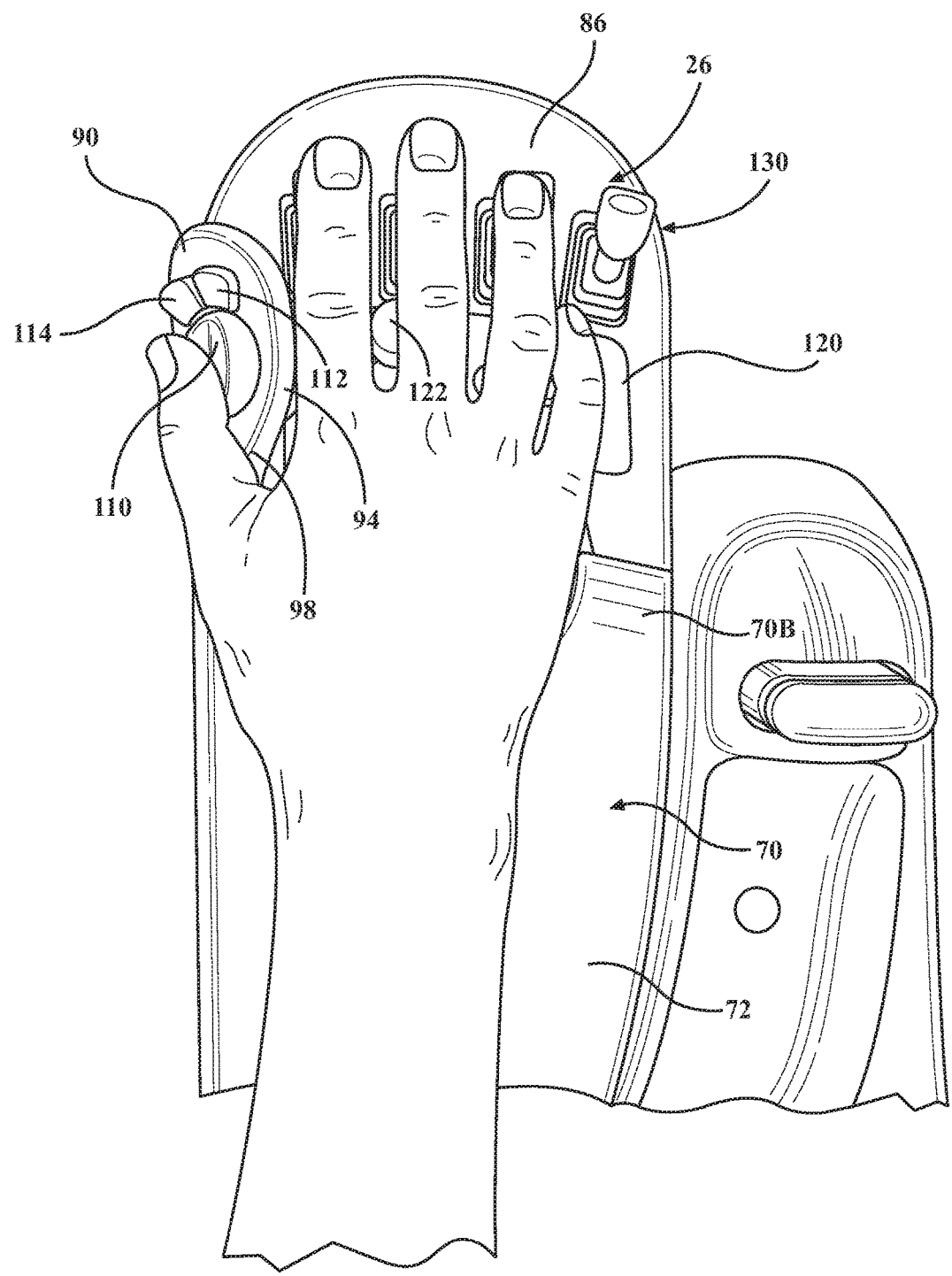
FIG. 6 is a top view of the control module of the materials handling vehicle of FIG. 1 and showing an operator's hand using the control module.

The element 90 is preferably no more than about 2.5 inches wide as measured in the lateral direction $D_{LAT}$ at a junction 98 of the element 90 that receives the joint between the operator's thumb and index finger, see also FIG. 6. The junction 98 may be located toward the base 92 of the element 90, just below a mid-height of the element 90. The width of the element 90 is also preferably tapered in the lateral direction $D_{LAT}$ from the base 92 to the upper portion 94, such that the element 90 is fairly narrow at the junction 98 and at the upper portion 94. The width, curvature, and tapering provides the element 90 with a suitable size and shape such that the element 90 is comfortably received by the joint between the operator's thumb and index finger, see FIG. 6. As shown in FIGS. 2, 3, and 5, a backside 100 of the element 90 may include a protuberance 102, which the operator may grasp while holding the element 90 during operation of the vehicle 10.

Referring to FIGS. 2-6, the element 90 includes structure for controlling at least one vehicle function via the thumb of the operator using the control module 26. In the illustrated embodiment, the structure is provided on a front side 104 of the element 90 and includes a switch 110 for controlling a travel direction of the vehicle 10 (forward or backward); a first button 112 for controlling a function of the load handling assembly 40, such as, for example, a rack height select function, e.g., wherein the vehicle 10 is programmed to define a set of fork stop locations for each of the plurality of rack beam heights in respective storage zones, wherein each storage zone may have different ceiling heights and corresponding different rack beam heights or locations; and a second button 114 for sounding a vehicle horn. As shown most clearly in FIGS. 4 and 6, the second button 114 is positioned forward from the switch 110 and the first button 112 toward a front portion 22A of the operator's compartment 22 (see FIG. 1), i.e., toward the second end 26D of the control module 26, such that the operator has easy access to the second button 114 to sound the vehicle horn while simultaneously using other features of the control module 26, such as finger-actuated structures that will be described in more detail below. It is noted that the element 90 may include additional or alternate structure for controlling additional or alternate vehicle functions.

Due to the position and configuration of the element 90 on the upper surface 86, the element 90 provides a convenient and comfortable structure for the operator to grasp while operating the vehicle 10, and may partially define a home or default position for the operator's hand during operation, see FIG. 6.

Moreover, the undercut area 96 between the upper surface 86 and the upper portion 94 of the element 90 allows for the use of a corresponding one of a plurality of interchangeable modular plates or inserts with the control module 26. FIGS. 2 and 3 illustrate one exemplary modular plate 120, which includes a dial 122 or knob and one or more additional control elements 124. These structures 122, 124 are provided for controlling one or more vehicle functions, such as additional features of the aforementioned rack height select function. The modular plate 120 may be removable from the control module 26, wherein another modular plate, which may include alternate vehicle control structure or may comprise a blank plate with no vehicle control structure, may be provided in the place of the illustrated modular plate 120.

The control module 26 further includes additional finger-actuated structure 130 extending upwardly from the upper surface 86. In the embodiment shown, four finger-actuated structures 130A-D are provided, which may control respective vehicle functions and are operated by the operator's fingers. Exemplary vehicle controls implemented by the finger-actuated structures 130A-D include fork raise/lower, fork tilt, fork side shift, fork extend, and the like. It is noted that other types of finger-actuated controls may be used in place of the finger-actuated structures 130A-D illustrated in FIGS. 2-6, such as buttons, switches, etc.

Referring additionally to FIGS. 7-10, the palm rest 80 will now be described. The palm rest 80 includes an undercut portion 136 (see FIGS. 5, 7, and 8) located at an end portion 80A of the palm rest 80 underneath a top overhang portion 138, which undercut portion 136 may receive the operator's fingertips and provides the operator with a grasping surface when the operator's hand is in a horizontal gripping position, i.e., when the operator's fingers are curled around the overhang portion 138 such that the operator's fingers extend back into the undercut portion 136. The undercut portion 136 may also be used to reposition the palm rest 80 in the longitudinal direction $D_{LONG}$ as will be discussed below.

Figure 7:
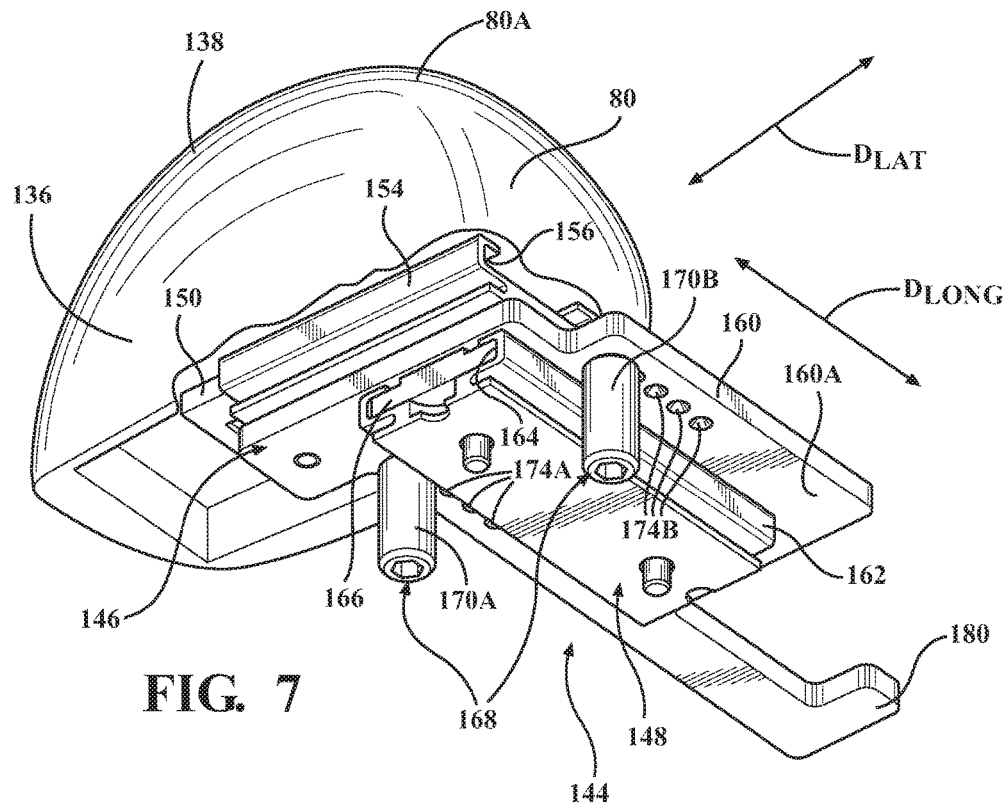

As mentioned above, the palm rest 80 is capable of movement in both the lateral direction $D_{LAT}$ and the longitudinal direction $D_{LONG}$, see FIG. 7. In accordance with an aspect of the invention, the vehicle 10 includes an attachment structure 144 that allows for the lateral and longitudinal movement of the palm rest 80, see FIGS. 7-10. The attachment structure 144 comprises a lateral attachment assembly 146 that allows for movement of the palm rest 80 in the lateral direction $D_{LAT}$, and a longitudinal attachment assembly 148 that allows for movement of the palm rest 80 in the longitudinal direction $D_{LAT}$.

The lateral attachment assembly 146 comprises a first part 150 that is secured to the palm rest 80 via a pair of pins 152 such that the first part 150 does not move relative to the palm rest 80. The lateral attachment assembly 146 further comprises a second part 154 that defines a channel 156 that the first part 150 slides laterally within to effect lateral movement of the palm rest 80, i.e., the palm rest 80 and the first part 150 move laterally with respect to the second part 154. Adjustment of the palm rest 80 in the lateral direction $D_{LAT}$ is accomplished by the operator moving the palm rest laterally.

The longitudinal attachment assembly 148 comprises a first piece 160 that is secured to the second part 154 of the lateral attachment assembly 146 and does not move longitudinally relative to the palm rest 80 or to the lateral attachment assembly 146. The longitudinal attachment assembly 148 further comprises a second piece 162 that defines a channel 164 that an extension portion 166 of the first piece slides longitudinally within to effect longitudinal movement of the palm rest 80, i.e., the palm rest 80, the lateral attachment assembly 146, and the first piece 160 of the longitudinal attachment assembly 148 move longitudinally relative to the second piece 162.

Figure 8:
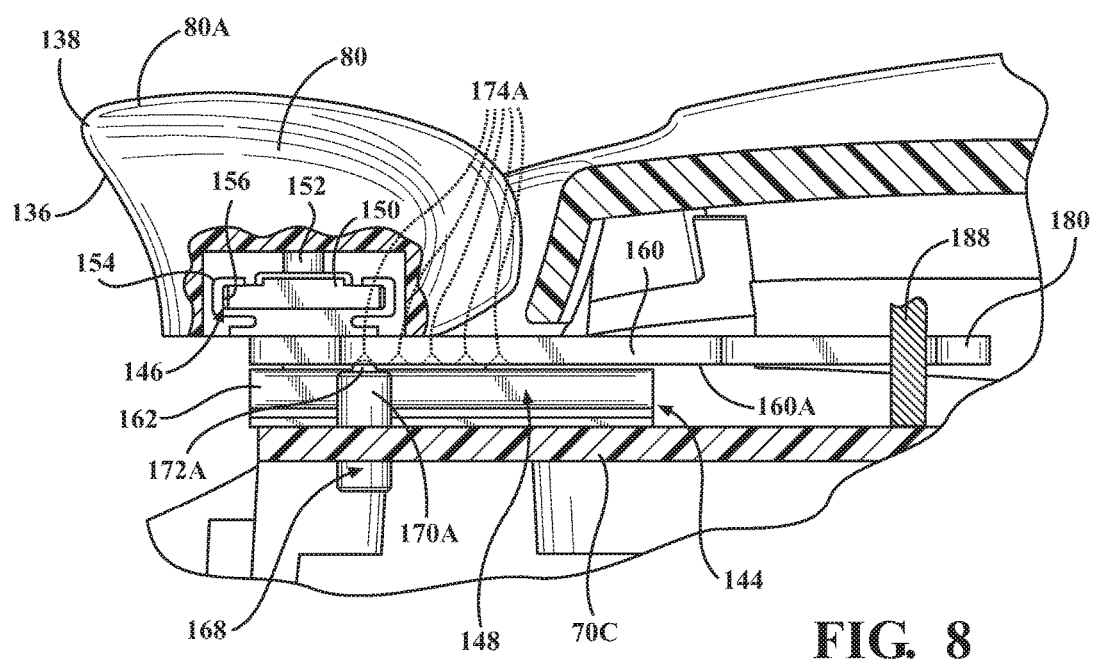

The longitudinal attachment assembly 148 additionally comprises securing structure 168 that is used to secure the palm rest 80 in a desired longitudinal position, see FIGS. 7 and 8. The securing structure 168 in the embodiment shown is fixed within the operator's compartment 22 to a portion 70C of the armrest 70 (see FIG. 8) and comprises a pair of laterally spaced apart members 170A, 170B that each include a protuberance 172A, 172B (only the protuberance 172A is shown in FIG. 8). The protuberances 172A, 172B are respectively received in a series of notches 174A, 174B formed in an underside 160A of the first piece 160 of the longitudinal attachment assembly 148 to prevent further movement of the palm rest 80 in the longitudinal direction $D_{LONG}$ until the notches 174A, 174B are removed from the respective protuberances 172A, 172B. Removing the notches 174A, 174B from the protuberances 172A, 172B is accomplished by the operator lifting the palm rest 80 vertically, e.g., by grabbing the grasping surface formed by the undercut portion 136 of the palm rest 80 and lifting the palm rest 80 upward, which raises the first piece 160 of the longitudinal attachment assembly 148 vertically such that the notches 174A, 174B are lifted from the protuberances 172A, 172B, thus allowing movement of the palm rest 80 to an alternate longitudinal position.

The first piece 160 of the longitudinal attachment assembly 148 additionally comprises retention structure 180 that prevents the attachment structure 144 from being removed from a slot 186 formed in the armrest 70 (see FIG. 2), which slot 186 receives the first piece 160 of the longitudinal attachment assembly 148. In the embodiment shown, the retention structure 180 comprises an L-shaped portion of the first piece 160 of the longitudinal attachment assembly 148, which L-shaped portion is in close proximity to a stop structure 188, e.g., a bolt, associated with the armrest portion 70C. When the palm rest 80 is in a fully extended position, the L-shaped portion abuts against the stop structure 188 to prevent further movement of the longitudinal attachment assembly 148 out of the slot 186, which correspondingly prevents further movement of the palm rest 80 in the longitudinal direction $D_{LONG}$ toward the control module 26. If the palm rest 80 or the attachment structure 144 is to be disassembled, the stop structure 188, which comprises a bolt in the embodiment shown, can be detached (unscrewed) from the armrest portion 70C so as to allow the attachment structure 144 to be completely removed from the slot 186.

While the illustrated palm rest 80 is capable of movement in both the lateral direction $D_{LAT}$ and the longitudinal direction $D_{LONG}$, movement of the palm rest 80 in only one of the lateral direction $D_{LAT}$ and the longitudinal direction $D_{LONG}$ may be possible. For example, a vehicle may include only one of the lateral attachment assembly 146 and the longitudinal attachment assembly 148 for effecting movement in only the lateral direction $D_{LAT}$ or the longitudinal direction $D_{LONG}$. In the case of only a lateral attachment assembly 146, the second part 154 could be affixed within the operator's compartment 22, e.g., to the armrest 70 or to the control module 26, and in the case of only a longitudinal attachment assembly 148, the second piece 162 could be affixed within the operator's compartment 22, e.g., to the armrest 70 or to the control module 26.

Additionally, while the armrest 70 shown and described herein is detached from the operator seat 28, the armrest 70 may be physically coupled to the operator seat 28 such that the armrest 70 moves when the operator seat 28 is moved, e.g., in the longitudinal direction $D_{LONG}$.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A materials handling vehicle comprising:
   a frame defining a main structural component of the vehicle;
   a load handling assembly; and
   an operator's compartment provided within the frame and comprising a control module including structure for controlling at least one vehicle function, the control module defining an upper surface and a fin-shaped handhold element extending generally vertically upward from the upper surface, the fin-shaped handhold element including an upper portion distal from the upper surface of the control module that is oriented at an angle of about 45°-75° relative to the upper surface in a lateral direction defined between a first side of the control module located proximate to an operator working position within the operator's compartment and a second side of the control module located distal from the operator working position so as to form an undercut area between the upper surface and the upper portion of the fin-shaped handhold element.

2. The materials handling vehicle of claim 1, wherein the fin-shaped handhold element is sized and shaped to be received by the joint between an operator's thumb and index finger.

3. The materials handling vehicle of claim 2, wherein the fin-shaped handhold element is no more than about 2.5 inches wide as measured in the lateral direction at a junction of the fin-shaped handhold element that receives the joint between the operator's thumb and index finger.

4. The materials handling vehicle of claim 3, wherein the width of the fin-shaped handhold element tapers in the lateral direction from the base to the upper portion.

5. The materials handling vehicle of claim 3, wherein the fin-shaped handhold element comprises a continuously curved member from the base to the outer portion.

6. The materials handling vehicle of claim 1, wherein the fin-shaped handhold element includes structure for controlling at least one vehicle function via the thumb of an operator using the control module.

7. The materials handling vehicle of claim 6, wherein the fin-shaped handhold element includes structure for controlling at least one of: a travel direction of the vehicle; at least one load handling assembly function; or a vehicle horn.

8. The materials handling vehicle of claim 6, wherein the fin-shaped handhold element includes a horn structure for sounding a vehicle horn and at least one additional structure for controlling at least one other vehicle function, wherein the horn structure is located forward from the additional structure toward a front portion of the operator's compartment.

9. The materials handling vehicle of claim 6, wherein the control module includes at least one additional structure extending upwardly from the upper surface of the control module for controlling at least one vehicle function via at least one of the operator's fingers.

10. The materials handling vehicle of claim 9, wherein the control module includes a plurality of additional structures extending upwardly from the upper surface of the control module for controlling a plurality of load handling assembly functions via the operator's fingers.

11. The materials handling vehicle of claim 1, wherein the vehicle further comprises an armrest in the operator's compartment proximate to the control module, the armrest for receiving the arm of an operator using the control module.

12. The materials handling vehicle of claim 11, wherein the vehicle further includes a palm rest in the operator's compartment proximate to the armrest, the palm rest for receiving the palm of the operator.

13. The materials handling vehicle of claim 12, wherein the palm rest is adjustable such that the operator can position their hand at a desired location with respect to the structure for controlling the at least one vehicle function.

14. The materials handling vehicle of claim 13, wherein the palm rest is adjustable in both the lateral direction and a longitudinal direction, the longitudinal direction defined between a first end of the control module located proximate to the armrest and a second end of the control module located distal from the armrest.

15. The materials handling vehicle of claim 11, wherein a longitudinal direction is perpendicular to the lateral direction and is defined between a first end of the control module located proximate to the armrest and a second end of the control module located distal from the armrest.

16. A materials handling vehicle comprising:
   a frame defining a main structural component of the vehicle;
   a load handling assembly; and
   an operator's compartment provided within the frame and comprising:
      a control module including structure for controlling at least one vehicle function;
      an armrest proximate to the control module, the armrest for receiving the arm of an operator using the control module; and
      a palm rest proximate to the armrest, the palm rest for receiving the palm of the operator, wherein the palm rest is adjustable in both a lateral direction and longitudinal direction such that the operator can position their hand at a desired location with respect to the structure for controlling the at least one vehicle function, the lateral direction defined between a first side of the control module located proximate to an operator working position within the operator's compartment and a second side of the control module located distal from the operator working position, and the longitudinal direction defined between a first end of the control module located proximate to the armrest and a second end of the control module located distal from the armrest.

17. The materials handling vehicle of claim 16, wherein the structure of the control module for controlling the at least one vehicle function comprises structure extending upwardly from an upper surface of the control module for being implemented via at least one of the operator's fingers.

18. The materials handling vehicle of claim 17, wherein the control module includes a plurality of structures extending upwardly from the upper surface of the control module for controlling a plurality of load handling assembly functions via the operator's fingers.

19. The materials handling vehicle of claim 16, wherein the control module defines an upper surface and includes a fin-shaped handhold element extending generally vertically upward from the upper surface, the fin-shaped handhold element including an upper portion distal from the upper surface of the control module that is oriented at an angle of about 45°-75° relative to the upper surface so as to form an undercut area between the upper surface of the control module and the upper portion of the fin-shaped handhold element.

20. The materials handling vehicle of claim 19, wherein the fin-shaped handhold element is oriented at the angle of about 45°-75° relative to the upper surface in the lateral direction toward the second side of the control module.

21. The materials handling vehicle of claim 19, wherein the fin-shaped handhold element is sized and shaped to be received by the joint between the operator's thumb and index finger.

22. The materials handling vehicle of claim 19, wherein the fin-shaped handhold element includes the structure for controlling the at least one vehicle function via the thumb of the operator.

23. The materials handling vehicle of claim 22, wherein the fin-shaped handhold element includes structure for controlling at least one of: a travel direction of the vehicle; at least one load handling assembly function; or a vehicle horn.

24. The materials handling vehicle of claim 22, wherein the fin-shaped handhold element includes a horn structure for sounding a vehicle horn and at least one additional structure for controlling at least one other vehicle function, wherein the horn structure is located forward from the additional structure toward the second end of the control module.

25. The materials handling vehicle of claim 16, further comprising attachment structure that allows movement of the palm rest in both the lateral direction and the longitudinal direction.

26. The materials handling vehicle of claim 25, wherein the attachment structure comprises a lateral attachment assembly comprising a first part that is secured to the palm rest and does not move relative to the palm rest and a second part that the palm rest is movable laterally relative to via sliding movement between the first part of the lateral attachment assembly and the second part.

27. The materials handling vehicle of claim 26, wherein the second part of the lateral attachment assembly defines a channel which the first part slides within to effect lateral movement of the palm rest.

28. The materials handling vehicle of claim 25, wherein the attachment structure comprises a longitudinal attachment assembly comprising a first piece that does not move longitudinally relative to the palm rest and a second piece that the palm rest is movable longitudinally relative to via sliding movement between the first piece of the longitudinal attachment assembly and the second piece.

29. The materials handling vehicle of claim 28, wherein the first piece of the longitudinal attachment assembly includes at least one series of notches that are capable of receiving at least one protuberance associated with a securing structure to secure the first piece and the palm rest in a chosen position until further movement of the palm rest in the longitudinal direction is desired, in which case the palm rest can be manipulated by the operator to remove the at least one protuberance from the corresponding notch, thereby again allowing longitudinal movement of the palm rest relative to the securing structure.

30. The materials handling vehicle of claim 16, wherein the palm rest includes an undercut portion in an end of the palm rest located toward the second end of the control module, the undercut portion for receiving the fingertips of the operator when the operator's hand is in a horizontal gripping position.

31. A materials handling vehicle comprising:
a frame defining a main structural component of the vehicle;
a load handling assembly; and
an operator's compartment provided within the frame and comprising:
a control module including structure for controlling at least one vehicle function;
an armrest proximate to the control module, the armrest for receiving the arm of an operator using the control module; and
a palm rest proximate to the armrest, the palm rest for receiving the palm of the operator, wherein the palm rest is adjustable relative to the armrest in a longitudinal direction such that the operator can position their hand at a desired location with respect to the structure for controlling the at least one vehicle function, the longitudinal direction defined between a first end of the control module located proximate to the armrest and a second end of the control module located distal from the armrest.

32. A materials handling vehicle comprising:
a frame defining a main structural component of the vehicle;
a load handling assembly; and
an operator's compartment provided within the frame and comprising:
a control module including structure for controlling at least one vehicle function;
an armrest proximate to the control module, the armrest for receiving the arm of an operator using the control module; and
a palm rest proximate to the armrest, the palm rest for receiving the palm of the operator, wherein the palm rest is adjustable in a lateral direction such that the operator can position their hand at a desired location with respect to the structure for controlling the at least one vehicle function, the lateral direction defined between a first side of the control module located proximate to an operator working position within the operator's compartment and a second side of the control module located distal from the operator working position.

33. A materials handling vehicle comprising:
a frame defining a main structural component of the vehicle;
a load handling assembly; and
an operator's compartment provided within the frame and comprising:
   a control module including a plurality of structures extending upwardly from an upper surface of the control module for controlling a plurality of load handling assembly functions via the operator's fingers; and
   a fin-shaped handhold element extending generally vertically upward from the upper surface, the fin-shaped handhold element including an upper portion distal from the upper surface of the control module that is oriented at an angle of about 45°-75° relative to the upper surface so as to form an undercut area between the upper surface and the upper portion of the fin-shaped handhold element, wherein the fin-shaped handhold element includes structure for controlling at least one vehicle function via the thumb of an operator using the control module.

34. The materials handling vehicle of claim 33, wherein the control module further includes additional structure for controlling at least one vehicle function.

* * * * *